US006600938B1

(12) United States Patent
Suzuki

(10) Patent No.: US 6,600,938 B1
(45) Date of Patent: Jul. 29, 2003

(54) VIBRATION ACTUATOR AND MOBILE COMMUNICATION TERMINAL

(75) Inventor: Fumihiro Suzuki, Shiroishi (JP)

(73) Assignee: NEC Tokin Corporation, Sendai (JP)

( * ) Notice: Subject to any disclaimer, the term of this patent is extended or adjusted under 35 U.S.C. 154(b) by 0 days.

(21) Appl. No.: 09/572,163

(22) Filed: May 17, 2000

(30) Foreign Application Priority Data

May 17, 1999 (JP) .......................................... 11-136200
Jun. 7, 1999 (JP) .......................................... 11-159210

(51) Int. Cl.[7] .................................................. H04B 1/38

(52) U.S. Cl. ...................... 455/567; 455/90; 340/384.1; 340/388.1; 381/190; 381/191

(58) Field of Search .......................... 455/90, 567, 575; 381/71.1, 71.2, 71.7, 190, 191; 340/384.1, 388.1, 388.4, 391.1, 407.1

(56) References Cited

U.S. PATENT DOCUMENTS

| | | | | |
|---|---|---|---|---|
| 5,172,092 A | | 12/1992 | Nguyen et al. | |
| 5,528,697 A | | 6/1996 | Saito | |
| 5,894,263 A | * | 4/1999 | Shimakawa et al. | 340/388.1 |
| 6,519,343 B1 | * | 2/2003 | Mansfield | 381/71.1 |

FOREIGN PATENT DOCUMENTS

| | | | | |
|---|---|---|---|---|
| EP | 0 791 405 | | 8/1997 | |
| EP | 0 906 790 | | 4/1999 | |
| JP | 4-278798 A | * | 10/1992 | H04R/17/00 |
| JP | 10-165892 | | 6/1998 | |

OTHER PUBLICATIONS

Patent Abstracts of Japan, vol. 1998, No. 11, Sep. 30, 1998 and JP 10–165892 A (EE C II TEC KK), Jun. 23, 1998—Abstract only.

* cited by examiner

*Primary Examiner*—Nay Maung
*Assistant Examiner*—Quochien B. Vuong
(74) *Attorney, Agent, or Firm*—Frishauf, Holtz, Goodman & Chick, P.C.

(57) ABSTRACT

A vibration actuator comprising a drive section having a coil placed in a cavity of a magnetic circuit, a vibrator driven by the drive section, a spacer made such that its end portion supports a peripheral edge portion of the vibrator, and an external plate member for covering the other end portion of the spacer. A closed space defined by the vibrator, the spacer and the external plate member is constructed as an acoustic space based on the Helmholtz's resonance principle. A mobile communication terminal contains the vibration actuator in its housing.

32 Claims, 8 Drawing Sheets

VIBRATION ACTUATOR AND MOBILE COMMUNICATION TERMINAL

BACKGROUND OF THE INVENTION

1. Field of the Invention

The present invention relates to vibration actuators, and more particularly to vibration actuators to be mounted in mobile communications, such as hand-held telephones for fulfilling a function to generate ringing tones, voices and vibrations.

2. Description of the Related Art

As the conventional art, Japanese Unexamined Patent Publication (JP-A) No. H10-165892 discloses a vibration actuator for use in a pager vibration actuator. The conventional vibration actuator includes a magnetic circuit composed of a permanent magnet, a yoke and a plate. This magnetic circuit is supported by a damper and a supporting rubber having a flexible structure and grappling with claw-like projections installed on a supporting base. With this construction, the magnetic circuit is flexibly movable up and down. The conventional vibration actuator is constructed such that the magnetic circuit moves up and down along its axial directions in response to supply of a drive current to a coil 15 to transmit the vibration through an outer peripheral portion of the coil and the supporting base to the external.

In the conventional vibration actuator, in the case of sound generation, since the vibrations of an external housing (body of equipment) act principally as a sound generating source, a drawback exists in that, depending on the design and thickness of the housing, a lack of output sound pressure level occurs so that difficulty is experienced in setting a frequency characteristic arbitrarily.

In addition, as a further problem, a conventional mounting method incurs complexity of product configurations because the production configuration of the vibration actuator varies among the vibration actuator mounting modes.

SUMMARY OF THE INVENTION

Accordingly, it is an object of the present invention to provide a vibration actuator capable of setting the frequency characteristic arbitrarily while maintaining a high output sound pressure level, irrespective of the design and thickness of the external housing.

It is another object of this invention to provide a vibration actuator capable of realizing a plurality of mounting modes with one product configuration and of reducing its size while having an excellent acoustic characteristic.

It is still another object of this invention is to provide a mobile communication terminal including the foregoing vibration actuator.

According to one aspect of this invention, there is provided a vibration actuator comprising a drive section comprising a magnetic circuit with a magnetic gap and a coil placed in the magnetic gap, a vibrator driven by the drive section, an external plate member spaced from the vibrator, and a spacer disposed between the vibrator and the external plate member and having an end portion supporting a peripheral edge portion of the vibrator and an opposite end portion supporting the external plate member. The spacer is a tubular member so that a closed space is defined by the vibrator, the spacer and the external plate member to form an acoustic space based on the Helmholtz's resonance principle.

According to another aspect of this invention, there is provided a mobile communication terminal having a housing and containing a vibration actuator in the housing, the vibration actuator comprising a drive section comprising a magnetic circuit with a magnetic gap and a coil placed in the magnetic gap, a vibrator driven by the drive section, an external plate member spaced from the vibrator, and a spacer disposed between the vibrator and the external plate member and having an end portion supporting a peripheral edge portion of the vibrator and an opposite end portion supporting the external plate member. The spacer is a tubular member so that a closed space is defined by the vibrator, the spacer and the external plate member to form an acoustic space based on the Helmholtz's resonance principle.

In this invention, the closed space can arbitrarily be set in volume by changing the diameter of the vibrator, the height of the spacer or the diameter of the housing or the external plate member. Likewise, through holes can arbitrarily be set in area by changing its configuration/number.

DESCRIPTION OF THE PREFERRED EMBODIMENTS

First of all, prior to description of the preferred embodiments of the present invention, for a better understanding of this invention, A vibration actuator according to the conventional art will be described hereinbelow with reference to FIG. 1.

Figure 1:
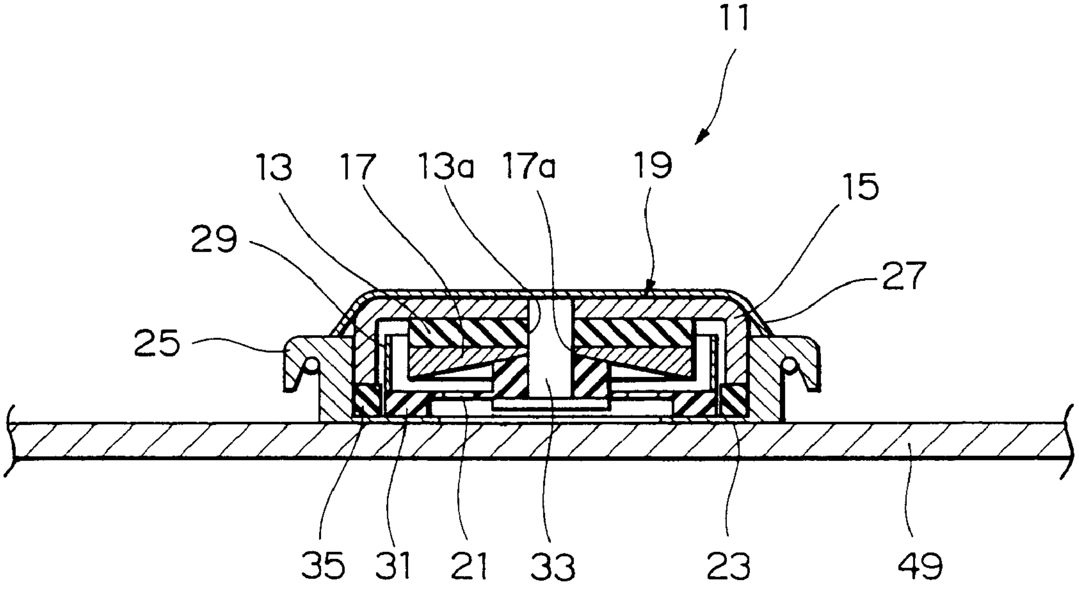
FIG. 1 PRIOR ART
FIG. 1 is a cross-sectional view showing one example of a vibration actuator according to the conventional art.

Referring to FIG. 1, a conventional vibration actuator 11 for use in pager comprises a permanent magnet 13, a yoke 15 and a plate 17 to establish a magnetic circuit 19. This magnetic circuit 19, through a damper 21 and a flexibly constructed supporting rubber 27 grappling with claw-like projections 25 set on a supporting base 23, is supported to be flexibly movable up and down. Additionally, a central shaft 33 is provided to join the yoke 15, the permanent magnet 13 and the plate 17 to the damper 21, while an elastic material 35 is used to prevent the yoke 15 from colliding directly with the supporting base 23. Still additionally, around the permanent magnet 13 and the plate 17 and inside the yoke 15, a coil 29 is positioned in a cavity of the magnetic circuit 19.

In the construction of this conventional vibration actuator 11, when a drive current is supplied to the coil 29, the magnetic circuit 19 moves up and down along its axial directions so that the coil 29 propagates vibrations through an outer peripheral section 31 of the damper 21 and the supporting base 23 to the external.

Now, descriptions will be made hereinbelow as regards the embodiments of the present invention with reference to FIGS. 2 to 8. In the following description, the parts corresponding to those of the conventional art are marked with the same reference numerals.

Figure 2:
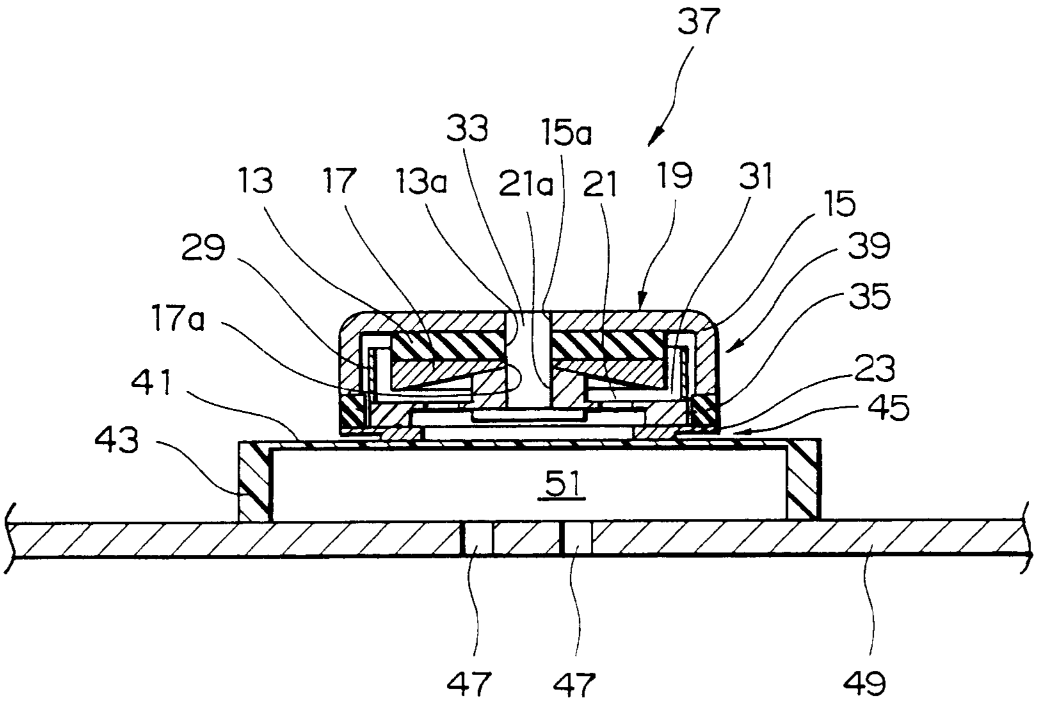
FIG. 2 is a cross-sectional view showing a vibration actuator according to a first embodiment of the present invention.

An actuator 37 according to a first embodiment of this invention shown in FIG. 2 is designed to be mounted in a mobile communication terminal, such as a portable telephone. In this actuator 37, a yoke 15 and a plate 17 are disposed so that a disc-like permanent magnet 13 is interposed therebetween, which forms a magnetic circuit 19. The central shaft 33 has a bolt-like configuration, and passes through a central hole 21 a of the damper 21 and further enters central holes 17*a,* 13*a* and 15*a* of the magnetic circuit 19. In other words, the central shaft 33 positions the magnetic circuit 19 and the damper 21 coaxially. The damper 21 is made of a metal or resin, and has a plurality of spirals to support the magnetic circuit 19 flexibly. The supporting base 23 is made of a resin, metal or rubber. The elastic material 35 is put between the yoke 15 and the supporting base 23 and adhered to the supporting base 23 in order to restrain the generation of sound resulting from the collision of the magnetic circuit 19 against the supporting base 23.

A drive section 39 comprises the magnetic circuit 19, a coil 29 and the damper 21 connected to this coil 29.

In addition, a diaphragm 41 is fixed to the supporting base 23, with the diaphragm 41 having an outer diameter larger than that of the supporting base 23. This diaphragm 41 constitutes a vibrator 45 together with the elastic material 35.

At an outer peripheral edge portion of the diaphragm 41, a tubular spacer 43 is provided in an integrated condition with the diaphragm 41 to produce a vibration transmitting section, with the spacer 43 being made with a tubular resin or rubber. The space is joined to the diaphragm 41 at one end portion. The combination of the diaphragm 41 and the spacer 43 are shaped into a cup-like configuration.

The other end portion of the spacer 43 is joined to a housing (body of equipment) 49 made of a metal or resin. The housing 49 forms an external plate member configuration and has sound emission holes 47. Incidentally, the diaphragm 41 and the spacer 43 can also be structured integrally with each other. Additionally, the diaphragm 41 and the spacer 43 are not always required to be formed into a circular configuration. Still additionally, a closed space 51 is a region defined and surrounded by the diaphragm 41, the spacer 43 and the housing 49 and is required to be a hermetically sealed space inhibiting inflow/outflow of air from/to the external, except for the sound emission holes 47.

In the vibration actuator thus constructed according to the first embodiment of this invention, when a drive current is applied to the coil 29, the coil 29, the damper outer peripheral portion 31 integrated with the coil 29, and the supporting base 23 vibrate due to reaction upon the magnetic circuit 19 supported flexibly by the damper 21, which causes vibrations of the diaphragm 41.

In this case, in the conventional art, the thickness and design of the housing 49 has a great influence on arbitrary setting of the frequency characteristic.

On the other hand, according to the first embodiment of this invention, in a frequency band between approximately 500 to approximately 1,500 Hz for voice, the diaphragm 41 realizes a flat frequency characteristic, while in a frequency band of approximately 2,500 Hz for ringing tone, a high sound pressure level develops owing to the resonance effect on the Helmholtz's resonator principle of the closed space, surrounded by the diaphragm 41, the spacer 43 and the housing 49, and the sound emission holes 47.

Figure 3:
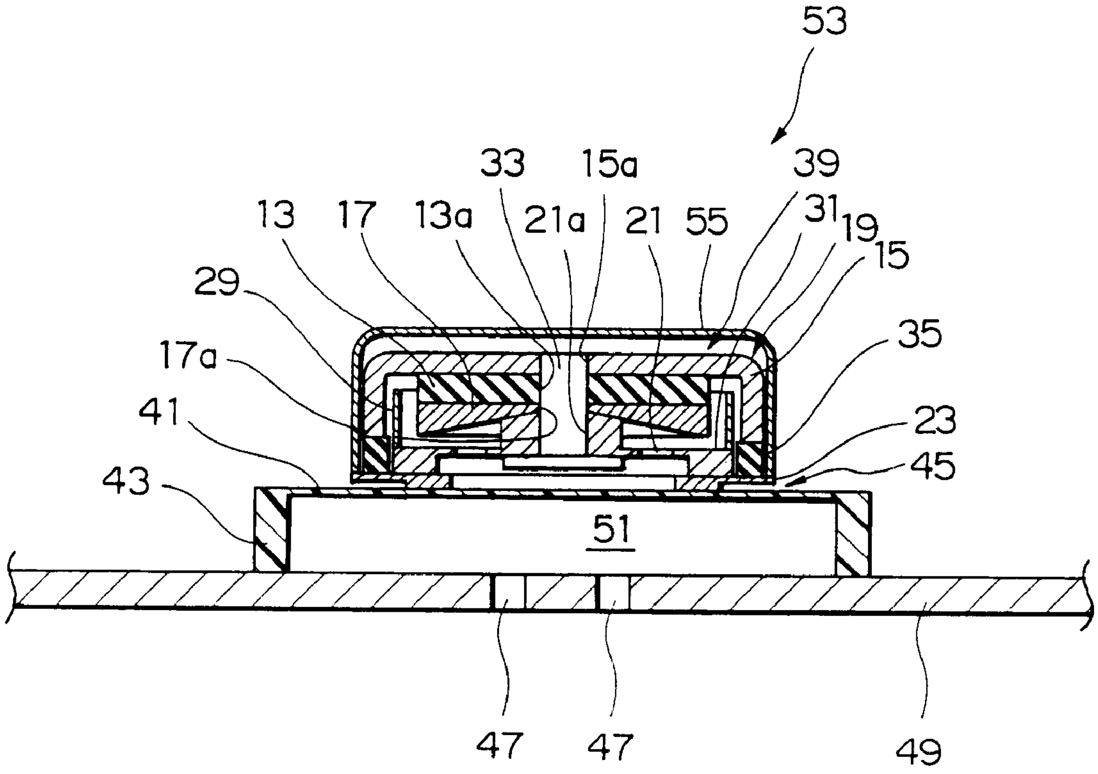
FIG. 3 is a cross-sectional view showing a vibration actuator according to a second embodiment of this invention.

In a vibration actuator 53 according to a second embodiment of this invention described in conjunction with FIG. 3, a protector 55, made of a resin, is provided to cover a range from the outer circumferential portion of a supporting base 23 to the outer circumference of a drive section. Other constructions are similar to the vibration actuator according to the first embodiment shown in FIG. 2.

That is, in FIG. 3, the actuator 53 is mounted in a mobile communication terminal such as a portable telephone. A magnetic circuit 19 is constructed in a manner that a yoke 15 and a plate 17 are disposed so that a disc-like permanent magnet 13 is interposed therebetween. A central shaft 33 has a bolt-like configuration, and passes through a central hole 21 a of a damper 21 and further enters central holes 17*a,* 13*a* and 15*a* of the magnetic circuit 19. In other words, the central shaft 33 positions the magnetic circuit 19 and the damper 21 coaxially. The damper 21 has a plurality of spirals to support the magnetic circuit 19 flexibly.

A combination of the supporting base 23 and the protector 55 can cover the vibration excitation section including the magnetic circuit 19, the coil 29, the central shaft 33 and the damper 21.

In addition, a diaphragm 41 is fixed to the supporting base 23. The diaphragm 41 has an outer diameter larger than that of the supporting base 23. At an outer peripheral edge portion of the diaphragm 41, a spacer 43, made with a tubular resin or rubber, is set integrally with the diaphragm 41. Still additionally, an elastic material 35 is put between the yoke 15 and the supporting base 23 and adhered to the supporting base 23 in order to suppress the generation of sound resulting from the collision of the magnetic circuit 19 against the supporting base 23.

A drive section 39 comprises the magnetic circuit, the coil 29 placed in a cavity of the magnetic circuit 19, the damper 21 connected to the coil 29, and the central shaft 33 for fixing these components along the axial directions.

A vibrator 45 comprises the supporting base 23, the diaphragm 41 and the elastic material 35.

In addition, the diaphragm 41 is fixed to the supporting base 23, and this diaphragm 41 has an outer diameter larger than that of the supporting base 23. At an outer peripheral edge portion of the diaphragm 41, a spacer 43, made with a tubular resin or rubber, is provided in an integrated condition with the diaphragm 41 to produce a vibration transmitting section 45.

The vibration transmitting section 45 provides a cup-like configuration with the tubular spacer 43 whose one end portion is joined to the diaphragm 41. The other end portion of the spacer 43 is joined to a housing 49 made of a metal or resin. The housing 49 forms an external plate member configuration and has sound emission holes 47. Incidentally, the diaphragm 41 and the spacer 43 can also be structured integrally with each other. Additionally, the diaphragm 41 and the spacer 43 are not always required to be formed into a circular configuration. Still additionally, a closed space 51 surrounded by the diaphragm 41, the spacer 43 and the housing 49 is required to be a hermetically sealed space inhibiting inflow/outflow of air from/to the external, except for the sound emission hole 47.

The effects of the vibration actuator 53 according to the second embodiment of this invention, other than that for which the protector intends, are similar to those of the first embodiment.

Figure 4:
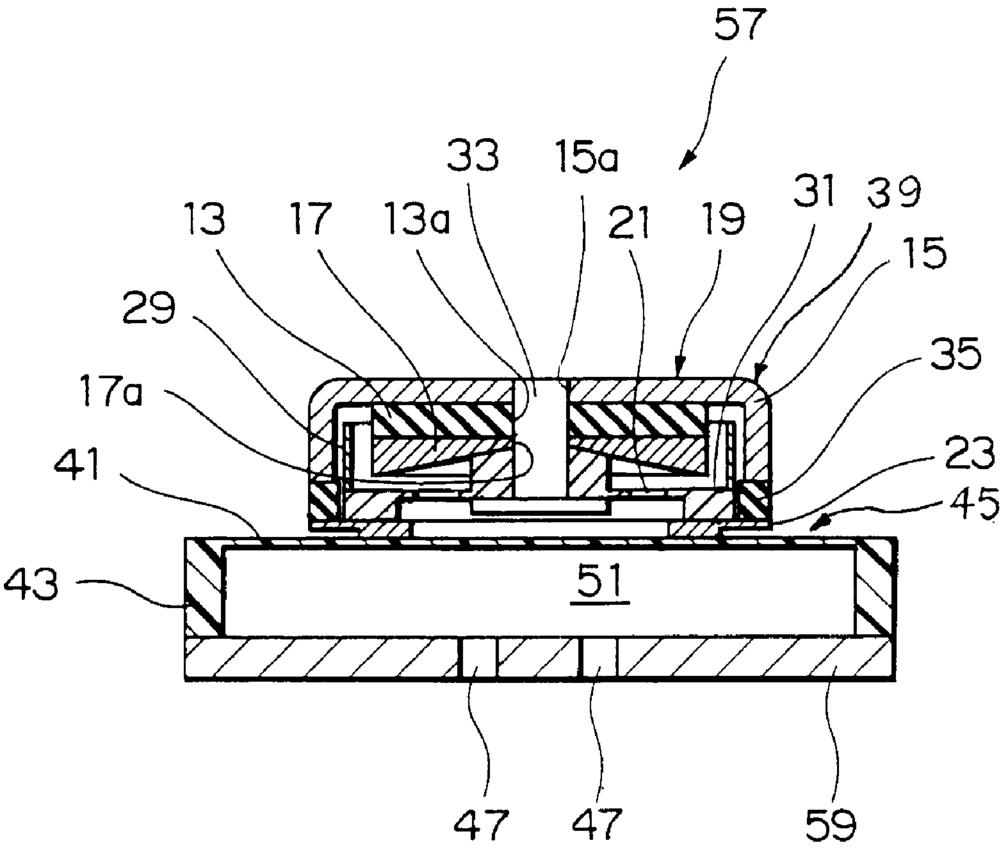
FIG. 4 is a cross-sectional view showing a vibration actuator according to a third embodiment of this invention.

Referring to FIG. 4, a vibration actuator 57 according to a third embodiment of this invention has the same construction as the first embodiment of FIG. 2 except that an external added plate 59 is used in place of the external housing 49.

In FIG. 4, in the vibration actuator 57, a magnetic circuit 19 is formed in a manner that a disc-like permanent magnet 13 is interposed between a yoke 15 and a plate 17. A central shaft 33 has a bolt-like configuration, and passes through a central hole 21*a* of a damper 21 and further comes in central holes 17*a,* 13*a* and 15*a* of the magnetic circuit 19. Accordingly, the central shaft 33 positions the magnetic circuit 19 and the damper 21 coaxially. The damper 21 has a plurality of spirals to support the magnetic circuit 19 flexibly.

A drive section 39 comprises the magnetic circuit 19, a coil 29 situated in a cavity of the magnetic circuit 19, the damper 21 connected to this coil 29, and the central shaft 33 for fixing these components.

Furthermore, an elastic material 35 is put between the yoke 15 and the supporting base 23 and adhered to the supporting base 23 in order to suppress the generation of sound resulting from the collision of the magnetic circuit 19 against the supporting base 23. Additionally, a diaphragm 41 is fixed to the supporting base 23, with the diaphragm 41 having an outer diameter greater than that of the supporting base 23.

A vibrator 45 comprises the supporting base 23, the diaphragm 41 and the elastic material 35.

At an outer peripheral edge portion of the diaphragm 41, one end portion of a tubular spacer 43 is provided as a vibration transmitting section to provide a cup-like configuration, with the spacer 43 being made with a tubular resin or rubber.

The other end portion of the spacer 43 is joined to a housing 59 made of a metal or resin. The housing 59 has an external plate member configuration and has sound emission holes 47. Incidentally, the diaphragm 41 and the spacer 43 can also be structured integrally with each other. Additionally, the diaphragm 41 and the spacer 43 are not always required to be formed into a circular configuration. Still additionally, a closed space 51 surrounded by the diaphragm 41, the spacer 43 and the housing 59 is required to be a hermetically sealed space inhibiting inflow/outflow of air from/to the external, except for the sound emission holes 47.

In the vibration actuator thus constructed according to the third embodiment of this invention, as in the case of the first and second embodiments, upon application of a drive current to the coil 29, the coil 29, the damper outer peripheral portion 31 integrated with the coil 29, and the supporting base 23 vibrate due to reaction upon the magnetic circuit 19 supported flexibly by the damper 21, which causes vibrations of the diaphragm 41.

As mentioned above, in the conventional art, the arbitrary setting of a frequency characteristic depends greatly on the thickness and design of the housing 59. However, according to the third embodiment of this invention, as with the first and second embodiments, in a frequency band between approximately 500 to approximately 1,500 Hz for voice, the diaphragm 41 realizes a flat frequency characteristic, while in a frequency band of approximately 2,500 Hz for ringing tone, a high sound pressure level develops owing to the resonance effect on the Helmholtz's resonator principle of the closed space, surrounded by the diaphragm 41, the spacer 43 and the external added plate 59, and the sound emission holes 47.

Figure 5:
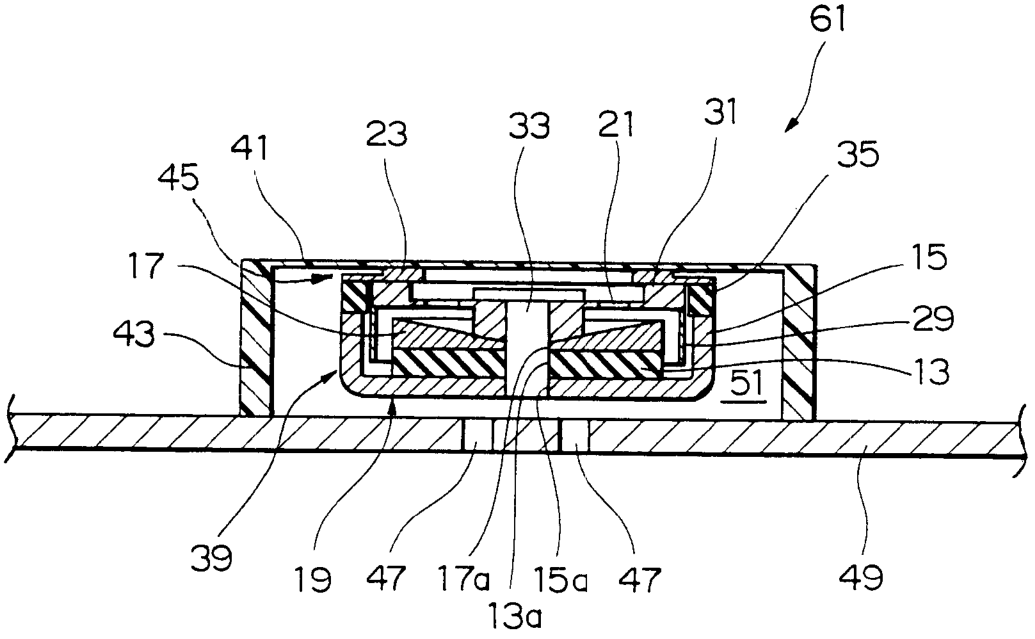
FIG. 5 is a cross-sectional view showing a vibration actuator according to a fourth embodiment of this invention.

Referring to FIG. 5, in the case of a vibration actuator 61 according to a fourth embodiment of this invention, a vibration excitation section is mounted in a closed space, designated at 51', in any one of the vibration actuators 37, 53 and 57 shown in FIGS. 2 to 4.

In the actuator 61 according to the fourth embodiment, aside from the protector effect of a spacer 43, a supporting base 23 is fixed to a diaphragm 41 as in the case of the vibration actuators according to the first to third embodiments. Additionally, the vibration actuator 61 according to the fourth embodiment is designed such that the spacer 43 is also used as a protector for the vibration excitation section.

Naturally, the vibration actuator 61 according to the fourth embodiment has the effects similar to those of the actuators according to the first to third embodiments.

As described above, in the vibration actuators according to the first to fourth embodiments of this invention, because of a combination of a diaphragm and a closed space by which the resonance effect is available, an actuator is attainable which is capable of setting a frequency characteristic arbitrarily while maintaining a high sound pressure level, regardless of the design and thickness of an external housing.

Figure 6:
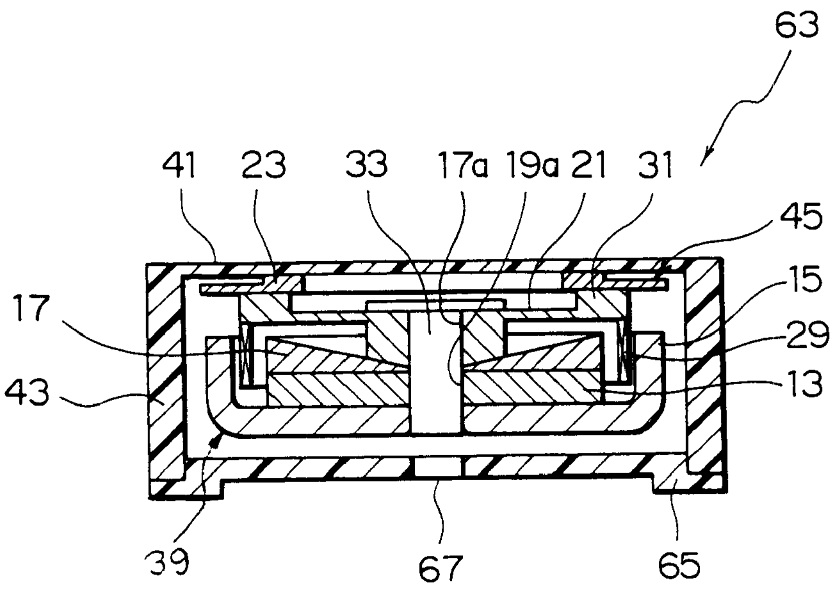
FIG. 6 is a cross-sectional view showing a vibration actuator for use in a mobile communication terminal according to a fifth embodiment of this invention.

Referring to FIG. 6, a vibration actuator 63 according to a fifth embodiment of this invention is designed to be mounted in mobile communication terminals such as portable telephones. A disc-like permanent magnet 13 is put between a yoke 15 and a plate 17, thereby producing a magnetic circuit 19. A central shaft 33 has a bolt-like configuration and penetrates the permanent magnet 13, the yoke and the plate 17. That is, the central shaft 33 passes through a central hole 21*a* of a damper 21 and further comes in a central hole 19*a* of the magnetic circuit 19. This means that the central shaft 33 positions the magnetic circuit 19 and the damper 21 coaxially.

The damper 21 is made of a metal or resin, and has a plurality of spirals to support the magnetic circuit 19 flexibly.

The supporting base 23 acting as a vibrator is made of a resin, metal or rubber.

A drive section comprises the coil 29, the magnetic circuit 19, the damper 21 and the central shaft 33 for fixing these components.

The vibrator comprises the supporting base 23 and the diaphragm 41.

The difference of the fifth embodiment of this invention from the abovedescribed first to third embodiments is that an elastic member does not exist for supporting an end portion of a yoke and a cover 65 having a dent portion on its outer side and a protruding portion on its inner side is provided on the opening side of a cup-like vibration transmitting section comprising a diaphragm 41 and a supporting member 43. This cover 65 has a sound emission hole 67 at its central portion.

That is, the supporting base 23 is fixed to the diaphragm 41 having an outer diameter greater than that of the supporting base 23 so that the diaphragm 41 and the supporting base 23 constitute a vibrator 45. At an outer peripheral edge portion of the diaphragm 41, the spacer 43, made with a tubular resin or rubber, is situated as a vibration transmitting section.

This spacer 43 accommodates, through its opening section, the protruding portion of the cover 65 made of a resin or metal and having the sound emission hole 67 so that the protruding portion thereof closes up the opening. Incidentally, the diaphragm 41 and the supporting member 43 can also be structured integrally with each other. Additionally, the cross section of each of the diaphragm 41, the supporting member 43 and the cover 65 is not always required to be formed into a circular configuration. Still additionally, a closed space surrounded by the diaphragm 41, the supporting member 43 and the cover 65 is required to be a hermetically sealed space inhibiting inflow/outflow of air from/to the external, except for the sound emission hole 67.

Figure 7:
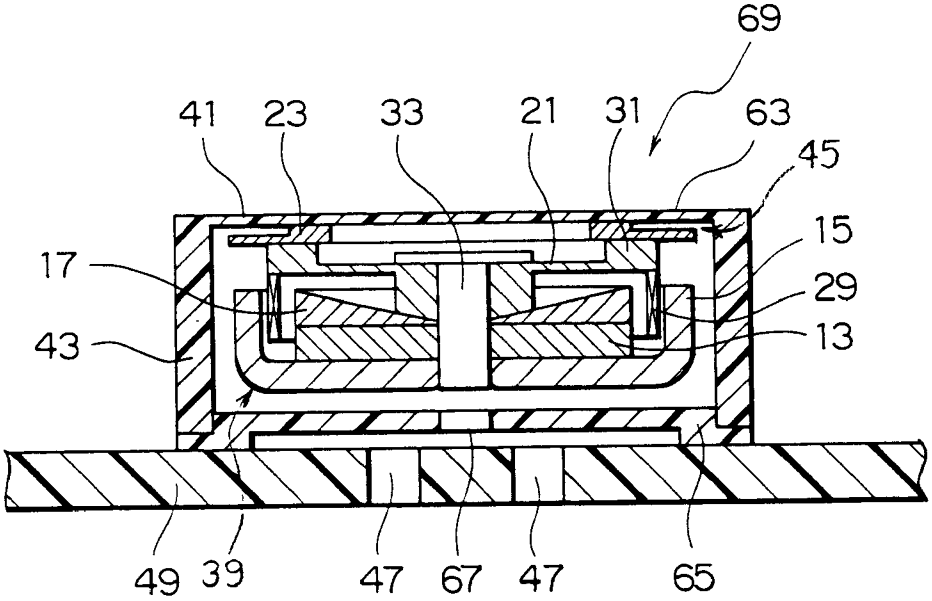
FIG. 7 is a cross-sectional view showing a construction of the vibration actuator mounted mobile communication terminal shown in FIG. 6, according to a sixth embodiment of this invention.

Referring to FIG. 7, a portion of a mobile communication terminal 69 in which the vibration actuator 63 is mounted on a portable telephone housing 49. The portable telephone housing 49 has a plurality of sound emission holes 47.

Secondly, a description will be given hereinbelow of an operation of the vibration actuator for use in the mobile communication terminal 69 according to a sixth embodiment of this invention.

In FIG. 7, upon application of a drive current to the coil 29, the coil 29, the damper outer peripheral portion 31 integrated with the coil 29, and the supporting base 23 vibrate due to the reaction upon the magnetic circuit 19 supported flexibly by the damper 21, which causes vibrations of the diaphragm 41.

In the case of arbitrary setting of a frequency characteristic, in a frequency band between approximately 500 to approximately 1,500 Hz for voice, the diaphragm 41 realizes a flat frequency characteristic, while in a frequency band of approximately 2,500 Hz for ringing tone, a high sound pressure level arises owing to the resonance effect on the Helmholtz's resonator principle of the closed space, surrounded by the diaphragm 41, the supporting member 43 and the cover 65, and the sound emission hole 67.

Figure 8:
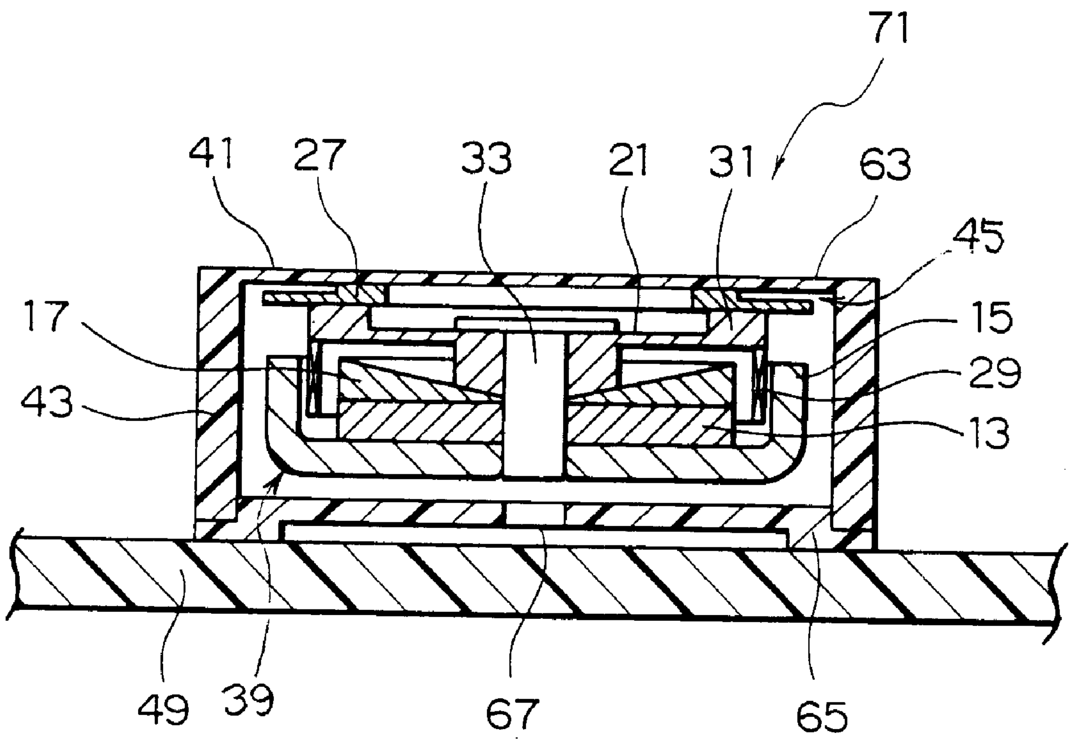
FIG. 8 is a cross-sectional view showing another construction of a mobile communication terminal with a vibration actuator according to the sixth embodiment of this invention.

Referring to FIG. 8, in another mobile communication terminal 71 according to the sixth embodiment of this invention, the vibration actuator 63 shown in FIG. 6 is mounted on the portable telephone housing 49. In the case of the mobile communication terminal 71 according to the sixth embodiment, the vibration actuator 63 vibrates the portable telephone housing 49 directly so that sound is emitted from its surface. Accordingly, no sound emission hole is made in the portable telephone housing 49, unlike the case shown in FIG. 7.

As described above with reference to FIGS. 7 and 8, a plurality of mounting modes are realizable with one product configuration, and a vibration actuator and a mobile communication terminal are attainable which have a reduced size and an excellent acoustic characteristic.

Figure 9:
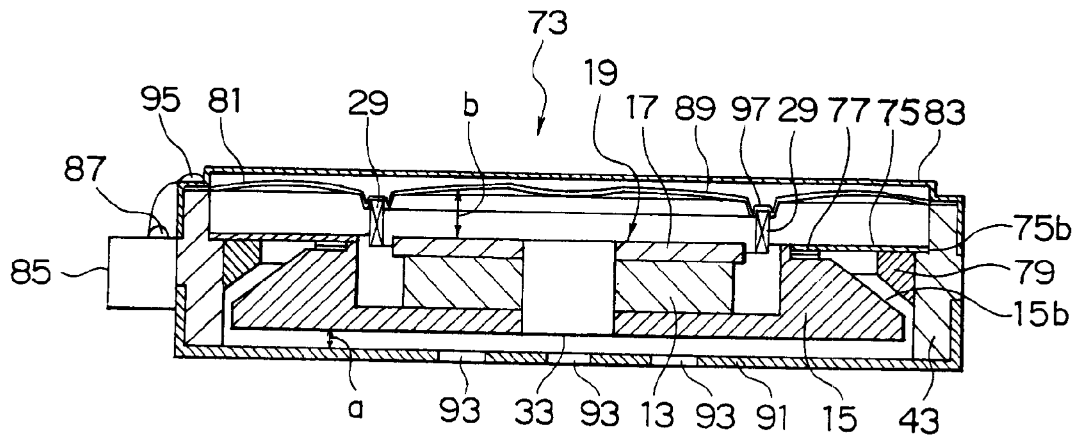
FIG. 9 is a cross-sectional view showing a vibration actuator according to a seventh embodiment of this invention.
Figure 10:
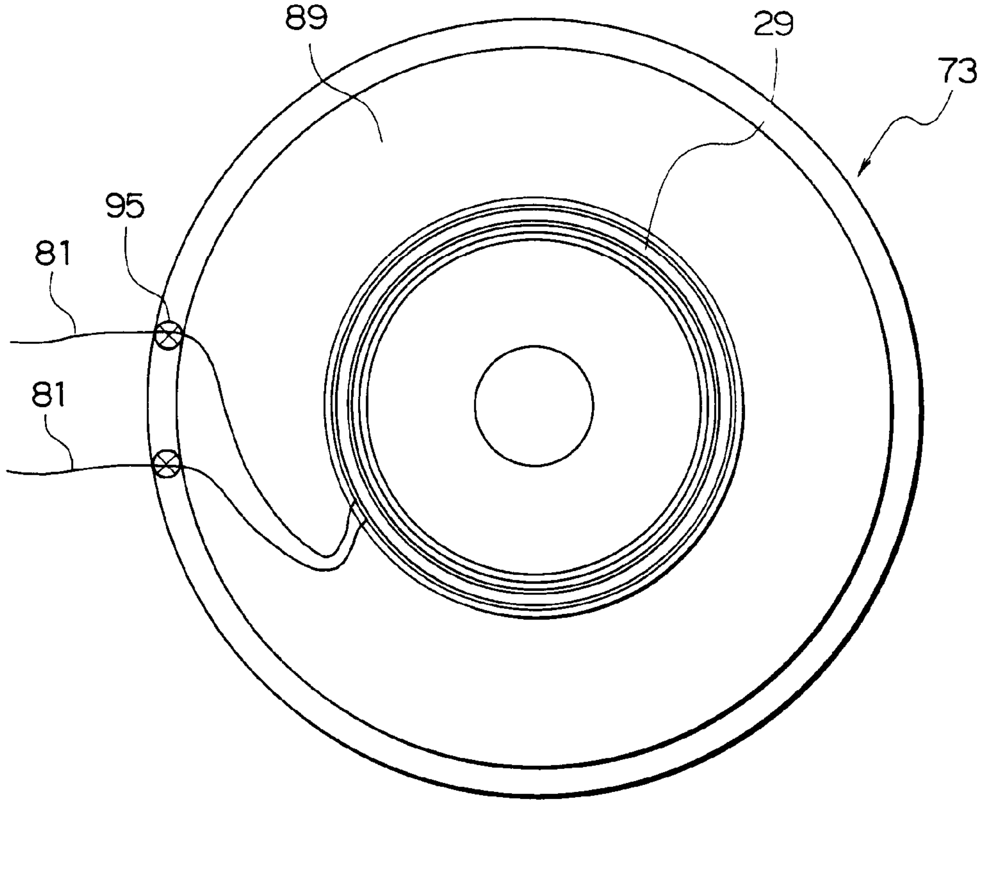
FIG. 10 is a plan view showing the vibration actuator shown in FIG. 9.

Referring to FIGS. 9 and 10, in a vibration actuator 73 according to a seventh embodiment of this invention, a plate 17 is piled up on one end surface of a permanent magnet 13, while an inner bottom surface of a pot-like yoke 15 is piled up on the other end surface thereof, thereby constructing a magnetic circuit 19 in a state where they are fixed coaxially through a central shaft 33. A side surface of the yoke 15 has a conical surface 15*b* formed such that its one end portion is smaller in diameter than its other end portion. The circumference of one end portion of the yoke 15 are adhered through an adhesive 77 to an inside surface of a suspension 75, while an outside surface 75*b* of the suspension 75 is supported by an inner surface of a spacer 43. The inner surface of the spacer 43 is supported by a stopper 79.

A coil 29 is placed in a cavity of the magnetic circuit 19, and both ends of this coil 29 are drawn through the use of coil lines 81. The coil lines 81 connected to both the ends of the coil 29 are fixed at an upper end portion of the spacer 43 by means of an adhesive or the like, and the tip portions thereof are connected to a terminal section 85 by soldering.

Furthermore, a vibrator 89, including the coil lines 81, is provided to travel through an upper section. Additionally, a first cover 83 is placed to cover an opening of an upper section of the tubular spacer 43, while a second cover 91 is situated to an opening of a lower section of the spacer 43. The second cover 91 has sound emission holes 93.

The vibrator 89 is shaped into an arbitrary curving configuration to limit the harmonic distortion components to a minimum, and this vibrator 89 has a configuration to avoid the contact with the magnetic circuit 19.

In addition, the tip portion of this vibrator 89 is dented into a concave configuration at an inner central portion of the coil 29, while the outer section thereof is formed to have a round convex configuration. In addition, a flat-plate configuration, a dish-like configuration, a curved configuration, a corrugated configuration and combinations thereof are also acceptable.

Still furthermore, the coil lines 81 of the vibrator 89 fixed outside the coil 29 creep in rectangularly bent, U-shaped or bellows configuration, or in a combination of these configurations, on a surface of the vibrator 89, and are set sporadically at arbitrary positions of the vibrator 89 through the use of an elastic material 95 such as an adhesive.

For example, the material for the vibrator 89 includes plastic film materials, such as PEI (polyether amide), PET (polyester), PC (polycarbonate, PPS (polyphenylene sulfide), PI (polyimide) and PPTA (aramid). However, the material therefor is not limited to these.

A separation b between the vibrator 89 or the suspension 75 is made to be larger than the separation a between the yoke 15 and the second cover 91. The magnetic circuit 19 and the coil 29 provided on the vibrator 89 operate in opposite phases to each other because their attraction and repulsion act mutually.

With this construction, the vibration actuator according to the seventh embodiment of this invention is applicable to various applications. In addition, this construction can offer a small-sized vibration actuator excellent in acoustic characteristic and vibration characteristic.

What is claimed is:

1. A vibration actuator (37,53,57,61,63) comprising:

a drive section (39) comprising a magnetic circuit (19) with a magnetic gap and a coil (29) placed in the magnetic gap;

a vibrator (45) driven by said drive section;

an external plate member (49,59,65,91) spaced from said vibrator (45); and a spacer (43) disposed between said vibrator (45) and said external plate member (49, 59, 65, 91) and having an end portion supporting a peripheral edge portion of said vibrator (45) and an opposite end portion supporting said external plate member (49, 59, 65, 91), wherein said spacer (43) is a tubular member so that a closed space (51) is defined by said vibrator (45), said spacer (43) and said external plate member (49, 59, 65, 91) to form an acoustic space based on the Helmholtz's resonance principle.

2. A vibration actuator according to claim 1, which is a unit for converting electrical energy into mechanical energy for generating at least one of voice, ringing tone and tactilely sensible vibrations to the external.

3. A vibration actuator according to claim 1, further comprising a damper (21) flexibly supporting said magnetic circuit (19) and said vibrator (45).

4. A vibration actuator according to claim 3, wherein said damper (21) is made of a plate spring.

5. A vibration actuator according to claim 3, wherein said magnetic circuit has a center portion to which said damper (21) is fixedly mounted at its center, while said coil (29) and said vibrator (45) are integrated with each other and fixed to an outer peripheral portion of said damper (21).

6. A vibration actuator according to claim 1, wherein said magnetic circuit (19) includes a permanent magnet (13), while said vibrator (45) vibrates in accordance with relative movement of said magnetic circuit (19) and said coil (29), said relative movement occurring in response to an electric signal inputted to said coil (29) and wherein said vibrator (45) includes a diaphragm (41) having an outer diameter larger than that of said drive section (39), and said external plate member is a part of an external housing (49), an external added plate (59) or a cover (65).

7. A vibration actuator according to claim 6, wherein said spacer is fixedly mounted to at least one of said vibrator (45), and said external plate member (49, 59, 65, 91).

8. A vibration actuator according to claim 6, wherein said diaphragm (41) has an outer extension portion outwardly extended from overall periphery of said drive section (39), said spacer (43) having a size corresponding to and being supported to the outer extension portion of said diaphragm (41).

9. A vibration actuator according to claim 8, wherein said external plate member is said external added plate (59) having an outer extension portion outwardly extended from the overall periphery of said vibrator (45).

10. A vibration actuator according to claim 6, wherein said external plate member is a cover (65) facing said diaphragm (41).

11. A vibration actuator according to claim 6, wherein said external plate member has a through hole (67,47,93) for establishing air flow between said acoustic space (51) and the outside.

12. A vibration actuator according to claim 11, wherein said closed space (51) and said through hole (67,47,93) work for the Helmholtz's resonance principle.

13. A vibration actuator according to claim 11, wherein said drive section (39) is located in the interior of said acoustic space (51).

14. A vibration actuator according to claim 1, further comprising a suspension (75) having a circular and spiral configuration so that said magnetic circuit (19) is supported by said spacer (43) through said suspension (75).

15. A vibration actuator according to claim 14, wherein said coil (29) and said magnetic circuit operate in opposite phase to each other due to mutual action of attraction and repulsion.

16. A vibration actuator according to claim 14, wherein said vibrator comprises a vibrating plate (89) has a curving configuration to limit harmonic distortion components to a minimum, and further has a configuration to avoid form engagement with said magnetic circuit (19).

17. A vibration actuator according to claim 14, wherein said vibrating plate (89) has any one of a flat-plate configuration, a dish-like configuration, a curved configuration, a corrugated configuration, and a combination thereof.

18. A vibration actuator according to claim 14, wherein said coil (29) has coil leads led out from both end portions of said coil, said coil leads are extended with any one of a rectangularly bent configuration, a U-shaped configuration, a bellows configuration, and a combination thereof, and are secured to at least one position of said vibrator through the use of an elastic material.

19. A vibration actuator according to claim 14, wherein said vibrating plate (89) is provided on one end side of said magnetic circuit, while said coil and said vibrating plate (89) are formed integrally with each other.

20. A vibration actuator according to claim 19, wherein a cover (91) is provided on the other end side of said magnetic circuit (19) for covering one end portion of said spacer (43), said magnetic circuit (19) and said cover (91) having a separation (a) formed therebetween to be shorter than another separation (b) between said magnetic circuit (19) and said vibrating plate (89).

21. A vibration actuator according to claim 14, further comprising a through hole (93) for establishing air flow between the closed space and the outside, said closed space being defined by a region surrounded by said vibrating plate (89), said cover (91) and said spacer (43).

22. A vibration actuator according to claim 21, wherein said closed space and said through hole work for the Helmholtz's resonance principle.

23. A vibration actuator according to claim 21, wherein said magnetic circuit (19), said coil (29) and said suspension (75) are placed in the interior of said closed space.

24. A vibration actuator according to claim 1, wherein said vibrating plate (89) is made of at least one plastic film material selected from polyether amide (PEI), polyester (PET or PES), polycarbonate (PC), polyphenylene sulfide (PPS), polyarylate (PAR), polyimide (PI), and aramid (PPTA).

25. A mobile communication terminal having a housing and containing a vibration actuator in the housing, said vibration actuator comprising:

- a drive section (39) comprising a magnetic circuit (19) with a magnetic gap and a coil (29) placed in the magnetic gap;
- a vibrator (45) driven by said drive section;
- an external plate member (49,59,65,91) spaced from said vibrator (45); and
- a spacer (43) disposed between said vibrator (45) and said external plate member (49, 59, 65, 91) and having an end portion supporting a peripheral edge portion of said vibrator (45) and an opposite end portion supporting said external plate member (49, 59, 65, 91),
- wherein said spacer (43) is a tubular member so that a closed space (51) is defined by said vibrator (45), said spacer (43) and said external plate member (49, 59, 65, 91) to form an acoustic space based on the Helmholtz's resonance principle.

26. A mobile communication terminal according to claim 25, which is a unit for converting electrical energy into mechanical energy for generating at least one of voice, ringing tone and tactilely sensible vibrations to the external.

27. A mobile communication terminal according to claim 26, wherein said housing (49) has an sound emission hole (47) so that one of said voice and said ringing tone is emitted through said housing having said sound emission hole to the outside.

28. A mobile communication terminal according to claim 26, wherein one of said voice and said ringing tone is emitted through said housing (49), which does not have a sound emission hole, to the outside.

29. A mobile communication terminal according to claim 25, further comprising damper (21) flexibly supporting said magnetic circuit (19) and said vibrator (45).

30. A mobile communication terminal according to claim 25, wherein said magnetic circuit (19) includes a permanent magnet (13), while said vibrator (45) vibrates in accordance with relative movement of said magnetic circuit (19) and said coil (29), said relative movement occurring in response to an electric signal inputted to said coil (29) and wherein said vibrator (45) includes a diaphragm (41) having an outer diameter larger than that of said drive section (39), and said external plate member is a part of an external housing (49), an external added plate (59) or a cover (65).

31. A mobile communication terminal according to claim 25, wherein said vibration actuator further comprising a suspension (75) having a circular and spiral configuration so that said magnetic circuit (19) is supported by said spacer (43) through said suspension (75).

32. A mobile communication terminal according to claim 25, wherein said vibrating plate (89) is made of at least one plastic film material selected from polyether amide (PEI), polyester (PET or PES), polycarbonate (PC), polyphenylene sulfide (PPS), polyarylate (PAR), polyimide (PI), and aramid (PPTA).

* * * * *